Dec. 16, 1924.
C. A. ABBOTT
JACK
Filed May 31, 1923
1,519,893
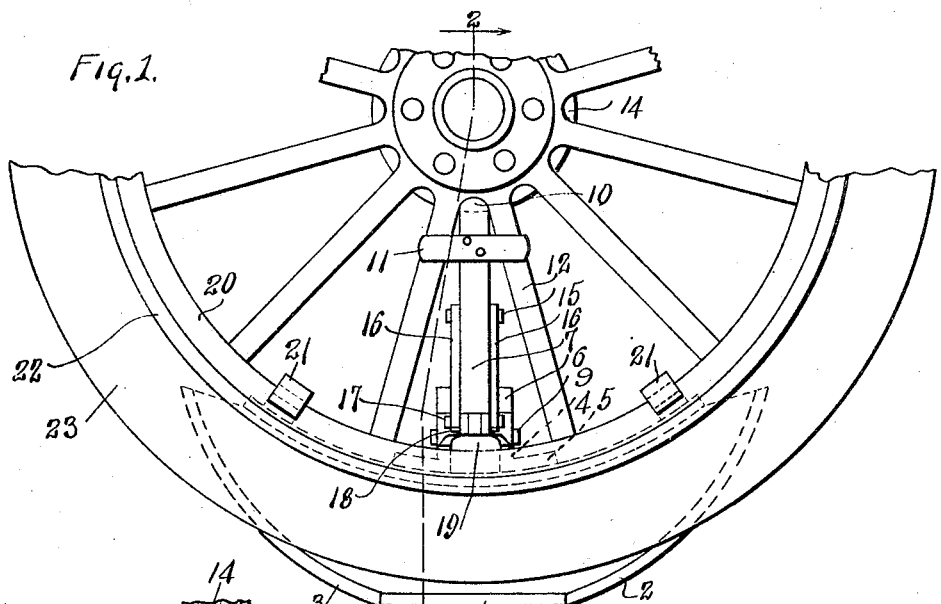
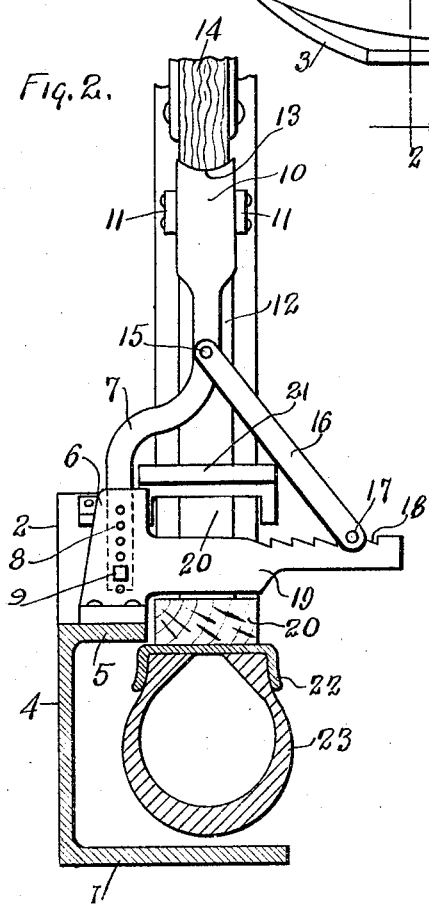
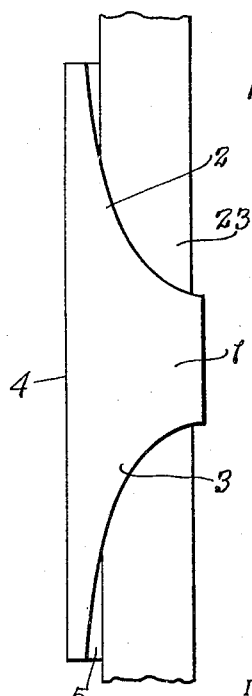
INVENTOR.
Charles A. Abbott,
BY Toulmin & Toulmin,
ATTORNEYS.

Patented Dec. 16, 1924.

1,519,893

UNITED STATES PATENT OFFICE.

CHARLES A. ABBOTT, OF SPRINGFIELD, OHIO.

JACK.

Application filed May 31, 1923. Serial No. 642,538.

*To all whom it may concern:*

Be it known that I, CHARLES A. ABBOTT, a citizen of the United States, residing at Springfield, in the county of Clark and State of Ohio, have invented certain new and useful Improvements in Jacks, of which the following is a specification, reference being had therein to the accompanying drawing.

My invention relates to jacks, and in particular to a lifting jack for a vehicle having a pneumatic tire.

It is the object of my invention to provide a lifting jack for a vehicle upon which are mounted pneumatic tires which will not necessitate any labor on the part of the operator to elevate the vehicle for the removal of the tire.

It is my object to provide a jack which may be simply adjusted into position and when adjusted the vehicle may be moved over it, thus lifting the vehicle and holding it in elevated position while the tire is removed and replaced.

It is a further object of my invention to provide a jack which is adjustable to different sizes of wheels on the same or different vehicles.

Referring to the drawings:

Figure 1 is a side elevation of my jack in position on a wheel with the wheel elevated looking at the assembly from the outside of the vehicle in the position of the operator who is about to remove the tire;

Fig. 2 is a section on the line 2—2 looking in the direction of the arrows on Fig. 1;

Fig. 3 is a bottom plan view showing the relationship of the foot to the tire.

Referring to the drawings in detail:

1 is a foot which rests upon the ground. This foot projects outwardly so that it extends substantially the width of the tire beneath the wheel. The foot tapers laterally and upwardly to form the rocking arms 2 and 3 upon which the vehicle rolls as it is being elevated or lowered, depending upon whether the vehicle is being placed over the foot or being removed from it.

These rocking arms and the foot are carried upon a vertical frame 4. This frame supports a semi-circular shoulder 5. Upon this shoulder there is mounted a vertically extending support 6. In this support is mounted adjustably an upwardly extending vehicle support 7. This arm is adjustable in the support 6 through the agency of the holes 8 in the support and the bolt 9 which passes through the holes in the support and through a corresponding hole in the arm. This arm passes upwardly, inwardly, and then upwardly a second time, until it terminates in a hub engaging head 10. This head carries on either side thereof transversely located plates 11 which positions the head with respect to the spokes 12, and prevents the lateral shifting of the hub.

The lateral shifting of the head is also prevented by the semi-circular depression of the head itself as at 13 which adapts it to fit a corresponding convexity of the hub 14. This arm 7 has pivoted thereon at 15, a diagonally extending arm 16 which carries at its lower end a cross member 17 which is adapted to engage with the various teeth 18 on a transversely extending arm 19 which is attached to the support 6. This arm extends over the felloe 20 of the wheel between the spokes.

As a further means of positioning this jack with respect to the wheel I provide U-shaped overlapping arms 21 which embrace the felloe of the wheel so that these arms are located at the extreme ends of the shoulder 5.

It will be seen that the arm 7 may move laterally about the bolt 9 and be adjusted in its lateral position by the engagement of the cross member 17 with any one of the teeth 18.

*Operation.*

In operation when the tire is deflated due to a puncture, for instance, I place my jack on the inside of the wheel either in front of or to the rear of the wheel itself. I then move the arm 7 so that the hub engaging head will come between the hub and the spokes, and the plates 11 will be in engagement with the spokes on either side thereof. The arm 16 is adjusted in position so that 17 is in engagement with the teeth 18. The jack is then adjusted in position so that the arms 21 overlap the felloe of the wheel.

The vehicle is moved so that it will ride up on the rocking arms 2 and 3 until the axle and hub are directly over the foot 1 at which point the wheel is at the position of maximum elevation. The tire is then suspended above the ground and readily removed and replaced.

By my invention I am thus able to do away with the difficult operation of elevating the vehicle by a reciprocating handle working in a jack which is not only a matter of trouble to operate but is very unsatisfactory in getting it positively located beneath the part of the vehicle for the elevating operation.

In the illustrations accompanying this application 22 designates the usual metal rim on the wheel and 23 a typical tire.

It will be understood that I comprehend within my invention suitable and necessary modifications which will occur to one skilled in the art in adopting my invention to varying conditions.

Having thus fully described my invention, what I claim as new and desire to secure by Letters Patent, is:—

1. In a jack, a semi-circular frame, a horizontally extending foot located midway thereof, upwardly and inwardly extending rocking arms, horizontally disposed from said frame on either side of said foot, means on said frame for supporting pivotally an upwardly extending arm adapted to be located between spokes of a wheel beneath a hub and adapted to have its upper end engage said hub, means extending from said frame between said hub and a felloe of a wheel, and a ratchet on said means, a pawl carried by said upwardly extending arm adapted to engage with said ratchet for adjusting the position of the arm with respect to the frame.

2. In a jack, a semi-circular frame, a horizontally extending foot located midway thereof, upwardly and inwardly extending rocking arms, horizontally disposed from said frame on either side of said foot, means on said frame for supporting pivotally an upwardly extending arm adapted to be located between spokes of a wheel beneath a hub and adapted to have its upper end engage said hub, means extending from said frame between said hub and a felloe of a wheel, and a ratchet on said means, a pawl carried by said upwardly extending arm adapted to engage with said ratchet for adjusting the position of the arm with respect to the frame, and means on the upper end of the arm for engaging the outer and inner sides of adjacent spokes.

3. In a jack, a semi-circular frame, a horizontally extending foot located midway thereof, upwardly and inwardly extending rocking arms, horizontally disposed from said frame on either side of said foot, means on said frame for supporting pivotally an upwardly extending arm adapted to be located between spokes of a wheel beneath a hub and adapted to have its upper end engage said hub, means extending from said frame between said hub and a felloe of a wheel, and a ratchet on said means, a pawl carried by said upwardly extending arm adapted to engage with said ratchet for adjusting the position of the arm with respect to the frame, means on the upper end of the arm for engaging the outer and inner sides of adjacent spokes, and overlapping arms at either end of said frame for engaging the inside of said felloe between said spokes.

4. In a jack, a semi-circular frame, a horizontally extending foot located midway thereof, upwardly and inwardly extending rocking arms, horizontally disposed from said frame on either side of said foot, means on said frame for supporting pivotally an upwardly extending arm adapted to be located between spokes of a wheel beneath a hub and adapted to have its upper end engage said hub, means extending from said frame between said hub and a felloe of a wheel, and a ratchet on said means, a pawl carried by said upwardly extending arm adapted to engage with said ratchet for adjusting the position of the arm with respect to the frame, means on the upper end of the arm for engaging the outer and inner sides of adjacent spokes, overlapping arms at either end of said frame for engaging the inside of said felloe between said spokes, and means for adjusting the upwardly extending arm vertically on said frame.

In testimony whereof, I affix my signature.

CHARLES A. ABBOTT.